United States Patent Office 3,231,232
Patented Jan. 25, 1966

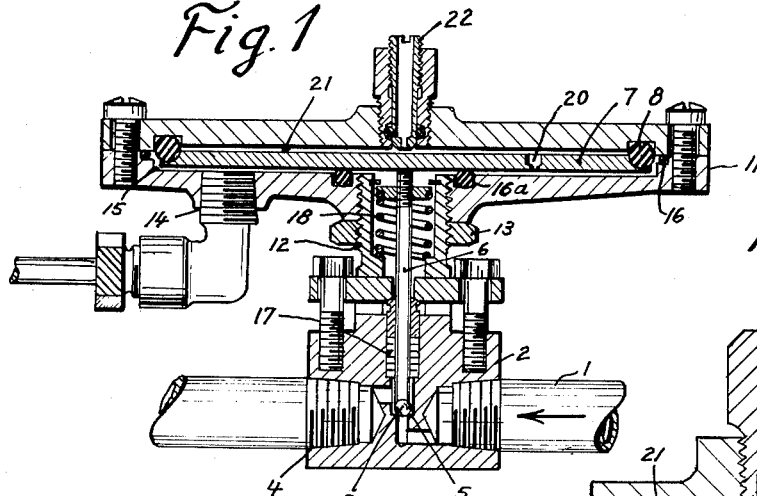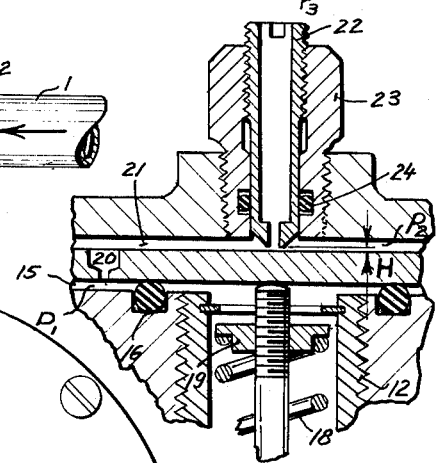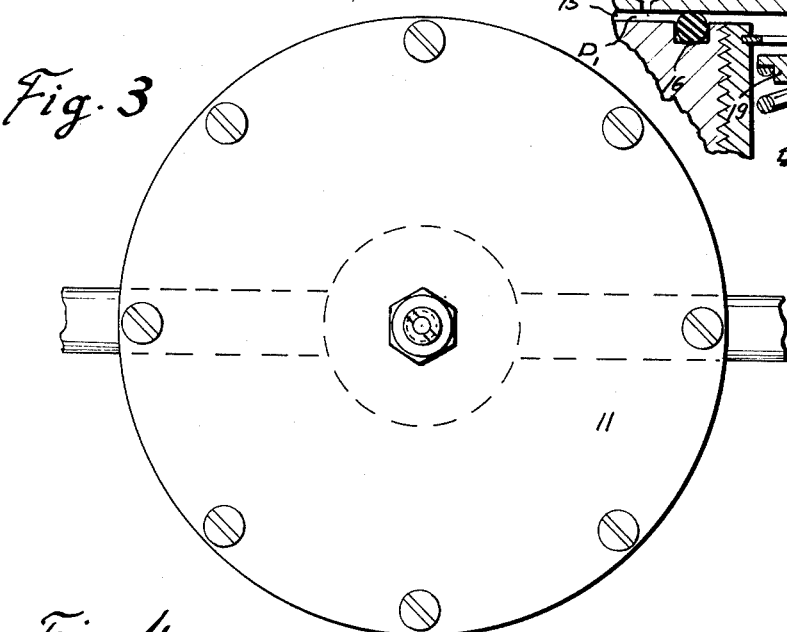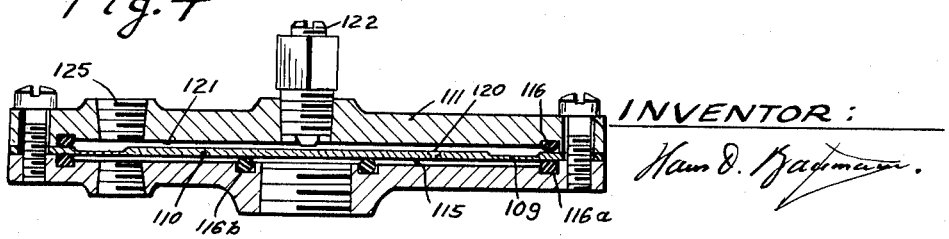

3,231,232
PNEUMATIC CONTROL VALVES
Hans D. Baumann, 203 Wayside Ave., Decatur, Ill.
Filed Aug. 8, 1963, Ser. No. 300,850
4 Claims. (Cl. 251—61)

This invention relates to a device capable of controlling very minute quantities of fluid in a control system.

In pilot plants of the petro-chemical industry or in certain chemical processes it is very important to control the flow of very minute quantities of liquids or gases down to several cubic centimeters per minute.

Valves presently employed for this service rely on the exact positioning of a cylindrical valve plug having a very fine clearance of less than .0001" in respect to a very precision machined valve orifice. Flow rates are varied by allowing a certain length of a fine surface groove of the plug to be exposed from the orifice. Not only does this type of valve require utmost care in machining and the selection of special materials to prevent seizing of the sliding parts but also offers very little control over the span of maximum to minimum obtainable flow rates (called "flow range") due to unavoidable machining errors. Valve positioners employed accurately to position said valve plugs need an auxiliary air pressure connection in addition to the pneumatic signal line.

The present invention has for an important object the built-in ability to select the desired flow range by external means without interruption of the control process.

Another object of my invention is the provision of a positioning device capable of selectively increasing or decreasing the effective operating pressure across the actuating diaphragm, in order to compensate for valve friction, normally responsible for hysteresis in valve control characteristics without the need for an additional auxiliary air supply.

A still further object of the invention is to provide a pneumatic control valve for use in fluid systems, which valve is of compact design and simple construction and which is capable of delivering trouble-free service without attention.

The above and other important objects and advantages of the invention will best be understood from the following detailed description, constituting a specification of the same, when considered in conjunction with the annexed drawings, wherein:

FIG. 1 is a vertical, central cross-sectional view, showing the structure and arrangement of parts of the invention.

FIG. 2 shows an enlarged view of the positioning means of the invention in cross-section.

FIG. 3 shows the invention from the top view.

FIG. 4 shows the actuating portion of the invention in an alternate type of construction employing a partly flexible diaphragm as means to motivate the valve stem, in a central cross-sectional view.

Referring now to the drawings in greater detail, the invention is illustrated in connection with a fluid system which includes a pipe-line, indicated at 1, delivering the fluid to be controlled into a valve housing 2. The fluid is throttled by a spherical valve plug 3 and is allowed to leave the valve housing 2 through the valve port 4. In the closed position the valve plug 3 is pressed firmly against the valve orifice 5 by means of a valve stem 6, which in turn is loaded by a plate 7, which, as shown in FIG. 1 is forced downward by the compression load of an elastically deformed rubber O-ring 8 in FIG. 1; or, referring to an alternate type of construction in FIG. 4, by the elastic tension in a thinned section 109 of a metal diaphragm 110. This stem loading in the closed position is achieved by screwing the valve actuator 11 towards the valve housing 2, utilizing a screw thread 12, thereby bringing the valve stem 6 in contact with plate 7 or diaphragm 110, respectively. Discontinuation of fluid flow will indicate when the plug 3 is properly seated. At this point the actuator position is secured by means of a lock-nut 13.

An air signal pressure, referred to in the description which follows as $P_1$, is piped at port 14 to the cavity 15 below the plate 7 or diaphragm 110. Escape of this air is prevented by the employment of suitable seals 16 and 16a, preferably rubber O-rings.

Following an increase in air pressure, the plate 7 or diaphragm 110 will expand upwards overcoming the stiffness of the O-ring 8 or section 109, respectively, and thereby allowing stem 6 to move upwards. In order to overcome friction of the stuffing box 17, a compression spring 18, exerting a certain force against a threaded spring button 19, is employed to push stem 6 against plate 7 or diaphragm 110. Once the stem is moved upward, the valve plug 3 will uncover orifice 5 and allow fluid to pass.

Referring again to the actuator 11, it should be pointed out that part of the air entering cavity 15 is allowed to escape through a fine metering orifice 20, having a cross-sectional flow area $F_1$, into cavity 21 on top of plate 7 or diaphragm 110. This air in cavity 21 is building up to a certain pressure $P_2$ depending on the flow area $F_2$ of a second passage allowing the air to escape to atmosphere $P_3$. This latter flow area $F_2$ is formed by the inner circumference $d\pi$ of an adjustable nozzle 22 and its distance H towards plate 7 or diaphragm 110. A second port 125 (see FIG. 4) in said actuator housing may be connected to an external gage to indicate said pressure $P_2$.

Assuming the distance H is relatively large, then $F_2$ is also large compared to $F_1$ and as a consequence, $P_2$ will be essentially equal to $P_3$, i.e., atmospheric, allowing the whole of pressure $P_1$ to act as a motivating differential pressure $\Delta p$ on plate 7 or diaphragm 110.

If, on the other hand, H is very small, so that $F_2$ approaches to zero, $P_2$ will become equal to $P_1$ and, as a result, $\Delta p$ approaches zero, which leads to zero valve lift. It is apparent therefore, that, by screwing nozzle 22 up or down to change the distance H, the effective actuating pressure $\Delta p$ (and therefore the valve lift) can be controlled in very small increments over a large range.

The relationship between H, $P_1$, and $P_2$ is best illustrated by the folowing equation:

$$H = \frac{F_1}{d\pi} \frac{\sqrt{P_1 - P_2}}{\sqrt{P_2 - P_3}} \frac{\sqrt{P_2}}{\sqrt{P_3}}$$

While the distance H at the maximum valve lift determines the amount of $\Delta p$ or $P_1 - P_2$, it may also be shown that this arrangement controls the accuracy of positioning of the valve stem. Between the valve-closed position and the full-lift position there exists an exact relationship between $P_1$ and $P_2$, as determined by the above equation.

Once the relationship is distorted by friction of the valve stem, for example the output pressure $P_2$ will be different from the one measured with a free and easy moving valve. To illustrate this behavior, one may assume that under normal condition and with signal pressure of 18 p.s.i.a. an output pressure $P_2$ of 14.9 p.s.i.a. is arrived at zero valve lift corresponding to a distance $H_1$ of 0.014". At 0.010" valve lift the distance $H_2$ is reduced to 0.004" producing a pressure $P_2$ of 23 p.s.i.a. for now 30 p.s.i.a. signal pressure $P_1$. Therefore, the normal actuating pressure $\Delta p = (P_1 - P_2)$ across the plate 7 or diaphragm 110 is between 3.1 and 7 p.s.i. corresponding to a valve lift from 0 to 0.010". If now, for any reason, the plug is prevented from moving up, that is the diaphragm 110 remains in the zero lift or $H_1=0.014''$ position, then $P_2$ will be reduced from 23 p.s.i.a. to 15.5 p.s.i.a. at $P_1=30$ p.s.i.a. signal pressure. This means that plate 7 or diaphragm 110 will see a $\Delta p$ of 14.5 p.s.i. instead of 7 p.s.i. at the maximum signal pressure $P_1$ or twice the normal operating pressure in order to overcome this resistance to valve movement. The "gain" of the actuator can be determined by dividing the percent $\Delta p$ or "true" signal change by the percent of external signal change $P_1$. For the previous example this gain is $$\text{Percent } p = \frac{14.5 - 3.1 \text{ p.s.i.} \times 100}{7 - 3.1 \text{ p.s.i.}}$$
$$= 292\%$$
$$\text{Gain} = \frac{292\% \ p}{100\% \ P_1}$$
$$= 2.92$$

Due to the fact that the valve lift is very short and in the order of several thousandths of an inch, there exists practically always a laminar flow pattern between the spherical seating surfaces of plug and orifice.

It can be stated, then, that the mass flow passing a laminar flow restriction is a function of $1^3$, where 1 is the distance between the seating surfaces throttling the fluid flow. In addition, there is an effective increase of 1 to the 1.25th power of the true valve lift L due to the geometric relationship of said spherical seating surfaces. This results in a total increase in mass flow of an amount equal to the 3.75 power of L.

Reducing now the maximum valve lift L by adjusting distance H as described above down to 25%, will effectively reduce the flow capacity of my invention at maximum signal input.

$$\frac{100\%}{25\%}^{3.75} = 180 \text{ times}$$

Conventional control valves having approximately 60% flow capacity in the next smaller plug and orifice size, need a total of 11 different plug and orifice sets in order to achieve this same range of adjustment.

The invention has been disclosed in connection with a specific embodiment of the same, but it will be understood that this is intended by way of illustration only and that numerous changes can be made in the construction and arrangement of parts. For instance, a rubber diaphragm may be used which cooperates with a conventional coiled compression spring instead of the solid steel diaphragm.

Having thus clearly shown and described the invention, what is claimed as new and desired to secure by Letters Patent is:

1. A control valve, comprising
    (a) a ported housing having an inner valve plug and an orifice,
    (b) a valve stem operatively connected to the plug,
    (c) actuator means consisting of a movable plate operatively connected to the stem, the plate being retained in the housing by elastic elements in a pressure-tight frame defining two chambers on opposite sides thereof,
    (d) an adjustable nozzle mounted in the frame and having a throttling portion arranged in cooperative relationship to the surface of the plate, the nozzle being sealed at its outer circumference with respect to the frame in one of said chambers adjacent said plate, and
    (e) a bleed orifice connecting said chambers on opposite sides of the plate within the frame, and a control pressure inlet port communicating with the other of said chambers.

2. A control valve as recited in claim 1, wherein the valve stem is forced against the surface of the movable plate by a compression spring.

3. A control valve as recited in claim 1, wherein the movable plate is clamped and sealed in the frame at its outer periphery between two halves of the frame and wherein the center portion of the plate is connected to the outer portion by a thin intermediate portion capable of elastic deformation.

4. A control valve as recited in claim 1, wherein the movable plate is a rigid disc supported at its outer periphery by an annular member formed of an elastomer material.

References Cited by the Examiner

UNITED STATES PATENTS 991,647    5/1911    Ridinger _____ 251—38 X

M. CARY NELSON, *Primary Examiner.*

A. JAFFE, E. FEIN, *Assistant Examiners.*